United States Patent [19]

van Calker et al.

[11] Patent Number: 4,928,812
[45] Date of Patent: May 29, 1990

[54] CONVEYOR BELT OF PVC PROVIDED WITH A COMPOUND LAYER OF REINFORCING MATERIAL AND A PROCESS OF WEAVING SAID REINFORCING LAYER

[75] Inventor: Freerk R. van Calker, Lathum; Antonius W.M. Ter Burg, Arnhem, both of Netherlands

[73] Assignee: Akzo NV, Arnhem, Netherlands

[21] Appl. No.: 203,732

[22] Filed: Jun. 2, 1988

[30] Foreign Application Priority Data

Jun. 4, 1987 [NL] Netherlands .................. 8701304

[51] Int. Cl.$^5$ .................................... B65G 15/30
[52] U.S. Cl. .................................... 198/847
[58] Field of Search .................. 198/846, 847

[56] References Cited

U.S. PATENT DOCUMENTS

| | | | |
|---|---|---|---|
| 3,063,884 | 11/1962 | Glover et al. | 198/847 X |
| 3,509,006 | 4/1970 | Baxendale et al. | 198/847 X |
| 3,612,256 | 10/1971 | Limbach et al. | 198/847 |
| 4,403,632 | 9/1983 | Romanski et al. | 198/846 X |
| 4,427,107 | 1/1984 | Roberts et al. | 198/847 X |
| 4,650,068 | 3/1987 | Vanassche et al. | 198/847 |

FOREIGN PATENT DOCUMENTS

| | | | |
|---|---|---|---|
| 0099205 | 1/1984 | European Pat. Off. | 198/847 |
| 0046534 | 11/1980 | Japan | 198/846 |
| 0009343 | 1/1982 | Japan | 198/847 |

Primary Examiner—Robert J. Spar
Assistant Examiner—James R. Bidwell
Attorney, Agent, or Firm—Stevens, Davis, Miller & Mosher

[57] ABSTRACT

A conveyor belt, which has a high strength, tear resistance and flame retardancy, and which is particularly suitable for use in coal mines. It comprises a matrix of thermoplastic resinous material, e.g., PVC, reinforced with an armouring comprising a layer of primary tension elements extending substantially rectilinearly in the longitudinal direction of the belt and consisting of continuous filaments, and covering layers consisting of yarns or threads disposed on both sides of the primary tension elements so as to impart coherence in the transverse direction of the belt, the top and bottom covering layers being connected by tying yarns or threads. The primary tension elements are composed of cables or cords of aramid. Adjacent primary tension elements are separated by gaps having a width of 0.5 to 3 times, more particularly 2 times the outer diameter of the primary tension elements. The gaps are filled up with one or more elements such as, e.g., cotton cables or cords.

4 Claims, 4 Drawing Sheets

CONVEYOR BELT OF PVC PROVIDED WITH A COMPOUND LAYER OF REINFORCING MATERIAL AND A PROCESS OF WEAVING SAID REINFORCING LAYER

The invention relates to a conveyor belt composed of a matrix based on a thermoplastic synthetic material, more particularly polyvinyl chloride, provided with a reinforcing construction comprising a layer of primary stress members formed by continuous filaments and extending substantially rectilinearly in longitudinal direction of the conveyor belt, which layer of primary stress members is provided on either side with a covering layer of yarns or filaments for imparting cohesion in transverse direction of the conveyor belt, the upper layer and the lower layer being interconnected by binder yarns or filaments.

A conveyor belt of the type indicated above is described, among other places, in GB No. 1 273 528. Although in principle reasonable results may be obtained with said known conveyor belt, it has the disadvantage that the stress members extending in longitudinal direction of the conveyor belt are provided in several parallel layers. Because of the distance between those parallel layers the reinforcing construction thus formed will occupy a relatively large volume in proportion to the load to be taken up by it. This is its turn leads to a larger diameter of the conveyor belt, for the reinforcing construction must always be covered with a layer of matrix material of which the thickness must not be below a particular minimum value. A conveyor belt having a relatively large diameter has a higher cost price and is less economical in use. Further, it should be realized that in operation a conveyor belt is subjected to a strongly varying bending load. Also for that reason a relatively thick reinforcing construction is disadvantageous, a compressive load occurring in the innermost layer of the stress members and a tensile load in the outermost layer of the stress members. Moreover, because of the high dynamic load to which the known conveyor is subjected in operation, there will be a great chance of delamination of the various layers of reinforcing material.

Mention is also made of FR No. 1 373 653, which describes a conveyor belt comprising a matrix of polyvinyl chloride (PVC) and several reinforcing layers, which conveyor belt is particularly intended for use underground in coal mines because of the good fire retardancy of the PVC matrix. A disadvantage to said know conveyor belt is that the bearing warp yarns extending in longitudinal direction of the conveyor belt are separated by fairly large spaces which are only filled with the matrix material, which is detrimental to the tear resistance of said known conveyor belt.

EP No. 0 020 038 describes a conveyor belt which may consist of a PVC matrix containing a reinforcing construction formed by at least five parallel plies which are interwoven with warp yarns which extend zigzag between the various layers. A disadvantage to this known conveyor belt is that the effective strength is unfavourably influenced by the strongly zigzag course of the warp yarns. Moreover, the great thickness of the fairly great number of layers leads to insufficient flexibility and a necessarily large diameter of the conveyor belt, which is also objectionable.

GB No. 1 589 467 describes a conveyor belt comprising two superimposed layers (joined with an adhesive) of stress members which extend in longitudinal direction of the conveyor belt and are composed of filaments of aromatic polyamide. Also when this known conveyor belt is subjected to a high dynamic working load, there is the risk of delamination of the two layers.

FR No. 1 288 590 describes a conveyor belt which comprises an upper and a lower matrix layer between which there is provided a layer of reinforcing cables of synthetic material. In its upper half the belt is provided with a separate transversely extending fabric layer which is not connected to the centrally provided reinforcing cables and is positioned at some distance therefrom. Because of the lack of coherence between the central reinforcing cables and the transversely reinforcing fabric layer this known belt offers too little remittance to tearing, so that it is insufficiently suitable for use in combination with a matrix of PVC.

GB No. 2 003 577 describes a conveyor belt comprising a matrix of rubber or some suitable synthetic material, such as PVC, in which a central reinforcing layer is provided. The central reinforcing layer is composed of one or more layers of parallel cords of aromatic polyamide, such as poly(p-phenylene terephthalamide), which cords have a minimum diameter of 2 mm and are spaced across the width of the belt. At some distance from the central reinforcing layer there is provided a transverse reinforcing layer. The space between the cords in the central reinforcing layer and between the transverse reinforcing layer and the central reinforcing layer is only filled with matrix material, so that this known conveyor belt will display insufficient tear resistance and is therefore unsuitable for use in combination with a matrix of PVC.

GB No. 2 048 793 A (see FIG. 6) and DOS No. 28 51 526 describe conveyor belts which contain as central reinforcing layer a series of parallel aramid cables extending in longitudinal direction of the conveyor belt, the space between the successive reinforcing cables having a width of up to about twice the diameter of the reinforcing cables. In that space are one or two yarns or cords having a far smaller diameter than that of the reinforcing cables. The reinforcing cables and the cords between them may be interconnected transversely by some kind of weft filaments. In these known conveyor belts the reinforcing layer therefore substantially consists of cables and cords practically separately extending in longitudinal direction of the conveyor belt. When use is made of a non-vulcanizable matrix material, such as PVC, such a reinforcing layer insufficiently adheres to the matrix and particularly the tear resistance is inadequate.

FR No. 2 499 527 describes a conveyor belt comprising a rubber matrix containing a plurality of reinforcing layers separated by a rubber layer. Because of the high dynamic load to which the conveyor belt is subject in operation, there is the risk of delamination of the various layers.

EP No. 0 185 008 A$_1$ describes a conveyor belt comprising a matrix containing a reinforcing layer consisting of a central conventional part with one or more fabrics. The upper and the lower sids of the central part are each provided with a stiffening layer containing a plurality of stiff cords of aramid which are spaced at relatively great intervals and make an angle of 45°–90° with the longitudinal direction of the conveyor belt. When use is made of a non-vulcanizable matrix material, such as PVC, the individual, practically independent stiff cords will display insufficient adhesion to the matrix, which will lead to inadequate tearing strength. EP No. 0 099 205 A1 and EP No. 0 213 219 describe conveyor belts which are each provided with a single reinforcing fabric of special warp cords, namely a mixed cord of aramid and elastic yarns or aramid cords of opposite twist.

Such a single fabric does not actually lend itself for the use in heavy conveyor belts containing a matrix of non-vulcanizable material, such as PVC, employed underground in mining.

The invention has for its object to provide a conveyor belt of the type described in the opening paragraph, which because of its favourable flame retardancy in combination with high strength is particularly suitable for underground coal mining. The conveyor belt according to the invention is in the first place characterized in that the primary stress members are each formed by one or more cables or cords of filaments of aramid, more particularly poly(p-phenylene terephthalamide), and the successive primary stress members are separated from each other by a space having a width of 0.5 to 3 times, preferably 2 times the outer diameter of the stress members, or more particularly practically equal to the outer diameter of the stress members, which space is filled with one or more secondary filling members, such as one or more cotton cables or cords. If a stress member is composed of two or more cables or cords, then by the outer diameter of the stress member is to be understood the width taken up by the two or more cables or cords in weft direction.

The conveyor belt according to the invention is advantageously characterized in that the primary stress members have an outer diameter of 4 to 15 mm more particularly 7 to 12 mm, and the primary stress members and/or the secondary filling members each consist of a single cable or cord and the secondary filling elements each formed by one or more cables or cords have an outer diameter which is practically equal to the outer diameter of the primary stress members. A conveyor belt according to the invention which is particularly suitable for use of a PVC matrix is characterized in that the primary stress members, the secondary filling members and the covering layers on either side of the stress members together with the binder threads interconnecting the upper and the lower layer constitute a compound woven fabric. The conveyor belt according to the invention is also advantageously characterized in that at the joint of the conveyor belt the secondary filling members are removed from the spaces separating the stress members and replaced with primary stress members in such a way that at the belt joint there are present a number of primary stress members of the one and the other belt end which overlap each other in longitudinal direction of the conveyor belt. Thus in the conveyor belt according to the invention a joint which ensures a high effective strength can be combined with a high fire resistance and the high effective strength of the stress members formed by filaments of aromatic polyamide. It should be noted that the above joining technique is known in itself for use in conveyor belts of a different type, viz. a matrix of rubber provided with steel reinforcing cables, as described in GB No. 1 279 934. An important characteristic of the conveyor belt according to the invention consists in that it comprises a gelling matrix of a non-vulcanizable material, such as PVC.

Another favourable embodiment of the conveyor belt according to the invention is characterized in that at the joint of the conveyor belt the secondary filling members are removed from the spaces separating the stress members, and at said joint the primary stress members of the two belt ends have their ends in contact or practically in contact with each other, and the co-axial spaces between the stress members of the two belt ends are filled with separate stress members which do not form part of the stress members ending at some distance from the joint and are formed integral with the conveyor belt by way of the matrix.

The invention also comprises a particularly favourable process of manufacturing a woven fabric, in which process the warp material is positioned in reciprocating heddles which are operated by sheds, which process is characterized in that said composite fabric is manufactured by using compound heddles which each comprise a central locating nest for a primary stress member of a diameter D and upper and lower secondary locating nests which are at least separated from the central locating nest and serve to receive relatively thin warp threads having a diameter $d < \frac{1}{4}D$ of the upper or the lower covering layers of the compound fabric, and that between the compound heddles there are provided separate heddles with said binder warp threads, which latter heddles can be moved up and down between the successive compound heddles. The invention will be further described with reference to the accompanying schematic drawing.

Figure 1:
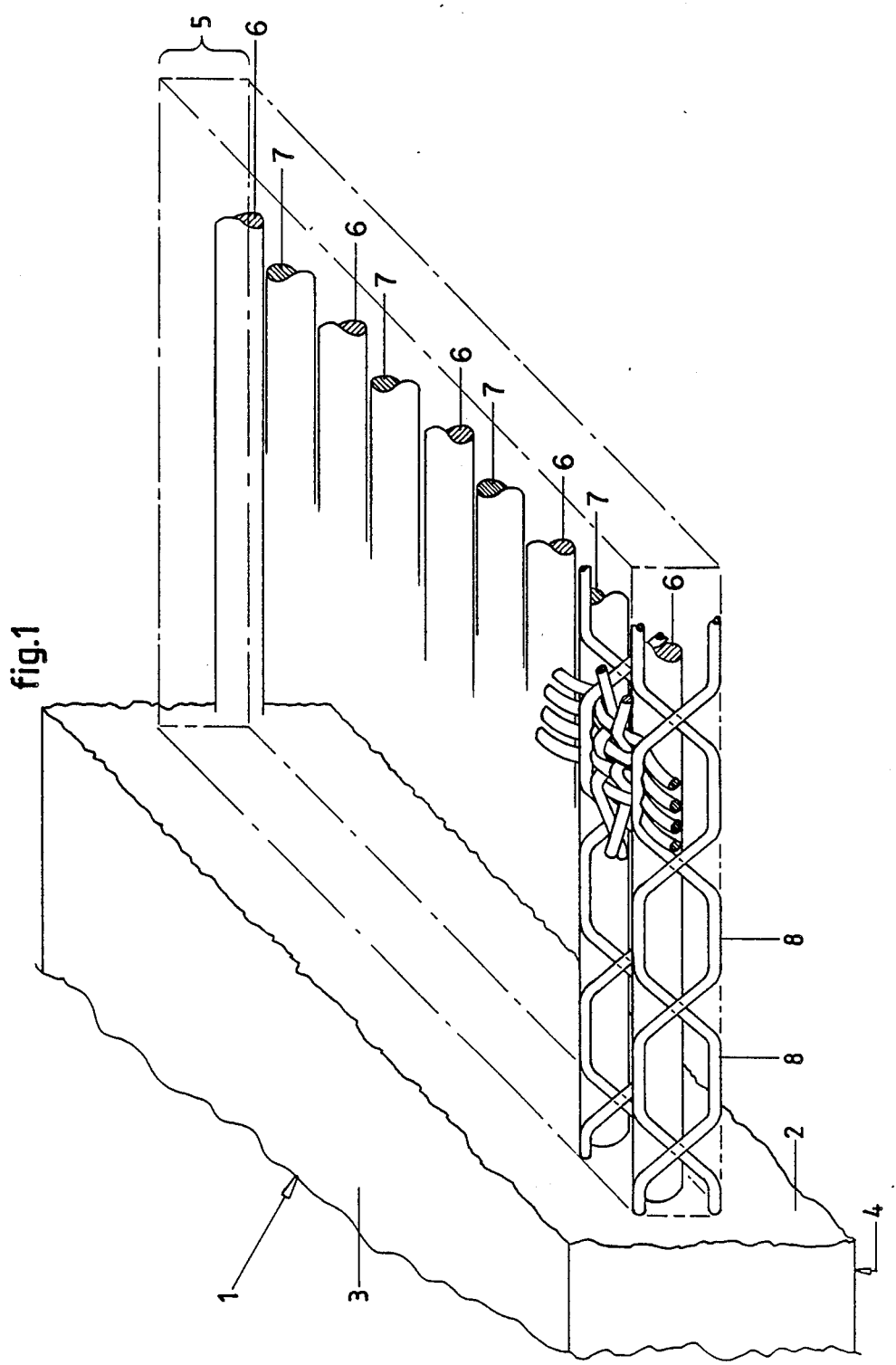
FIG. 1 is a cutaway in perspective of part the conveyor belt according to the invention.
Figure 2:
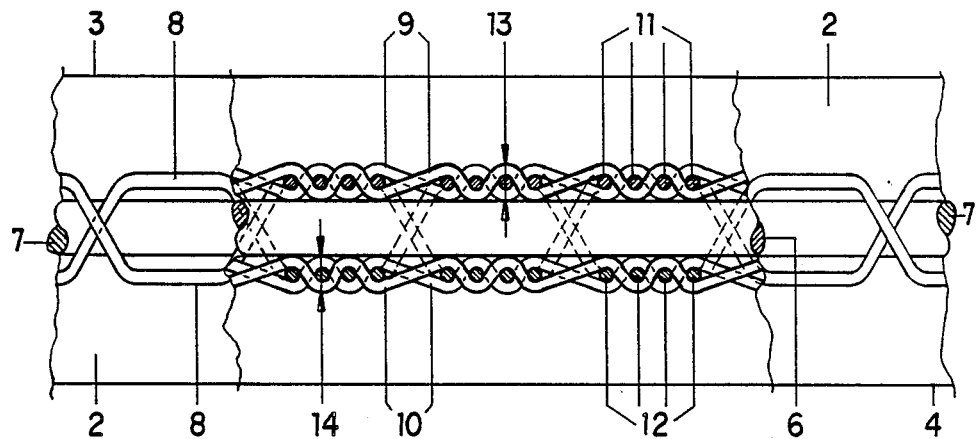
FIG. 2 is a view in longitudinal section of the conveyor belt.
Figure 3:
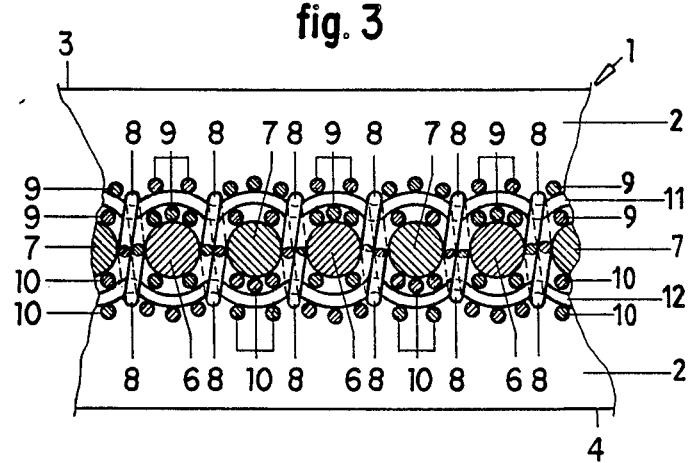
FIG. 3 is a cross-sectional view of the conveyor belt.

The conveyor belt 1 shown in FIG. 1 consists of a ground mass or matrix 2 of PVC and has an upper bearing surface 3 and a lower tread 4. The PVC matrix 2 is reinforced with the reinforcing construction generally referred to by the numeral 5, which in the construction shown in the drawing consists of a single compound fabric. The compound fabric 5 first of all contains a number of parallel cables or cords 6 which are composed of PPDT filaments and extend in longitudinal direction of the conveyor belt 1 and form the main load bearing stress members. In the space between every two successive PPDT cables or cords 6 there is provided a cotton cable or cord 7, of which in the illustrated construction the outer diameter is practically equal to the outer diameter D of the PPDT cables 6. The alternating cables or cords 6 and 7 are warp threads and form the middle layer of the compound fabric 5. Further, the compound fabric 5 still contains the binder warp yarns 8 of nylon 66. Of the compound fabric the upper layer 13 and the lower layer 14 contain the cotton warp yarns 9 and 10 respectively, and the nylon 66 weft yarns 11 and 12, respectively. Consequently, the upper covering layer 13 and the lower covering layer 14 in themselves constitute an upper fabric and a lower fabric which are connected to each other and to the middle layer formed by the cables or cords 6,7 via the binder warp yarns 8, so that these three layers form the compound fabric 5.

In an embodiment of the conveyor belt according to the invention the cables or cords 6,7 both have an outer diameter of 9 mm. and the alternating cables or cords 6,7 are disposed at centre-to-centre distances of 12 mm. When a complete conveyor belt has a width of, say, 1000 mm., the reinforcement in the form of the compound fabric 5 will comprise a few dozen alternating cables or cords 6,7 which extend in longitudinal direction of the conveyor belt. In this embodiment the stress members consist of laid cables 6 of PPDT filaments of the Twaron type 1001 built up from dtex 1680 f 1000 ×9 S 30 ×9 Z 30×4 S 51 mm and dtex 1680 f 1000×9 Z 30×9 S 30×4 Z 51 mm. The successive cables 6 are twisted and laid in alternating directions. The secondary filling elements consist of laid cables 7 of cotton of the construction dtex 1000×S 30×Z 30×7 S 51 mm. The binder warp 8 of nylon 66 is of Nylon 140 HRT formed into a cord of the construction dtex 1880 f 280×4 Z 260×3 S 150. In the upper fabric 13 and the lower fabric 14 are contained cotton warp yarns 9 and 10 of the construction dtex 1000×12 Z 30. The nylon 66 wefts 11 and 12 are yarns of the construction dtex 1880 f 280×9 Z 40 formed from Enka Nylon 140 HRT.

In the above-described embodiment of the conveyor belt according to the invention use was made for the compound fabric of a weave of the two-ply cloth type with binder warp and filler warp. The other particulars of the compound fabric in this embodiment are:

Warp:
  Cotton upper warp 9: Number of threads per 10 cm is 41,66
  PPDT cables 6: Number of threads per 1O cm is 4,16
  Cotton cables 7: Number of threads per 10 cm is 4,16
  Nylon binder warp 8: Number of threads per 10 cm is 16,64
  Cotton lower warp 10: Number of threads per 10 cm is 41,66

Weft:
  Upper nylon yarns 11 and lower nylon yarns 12: Number of threads per 10 cm. is 65.

The mass of this composite fabric is about 8000 g/m$^2$.

The compound fabric of PPDT, cotton and nylon 66 is subsequently impregnated in a manner known in itself with the matrix material which is preferably of PVC.

Figure 4:
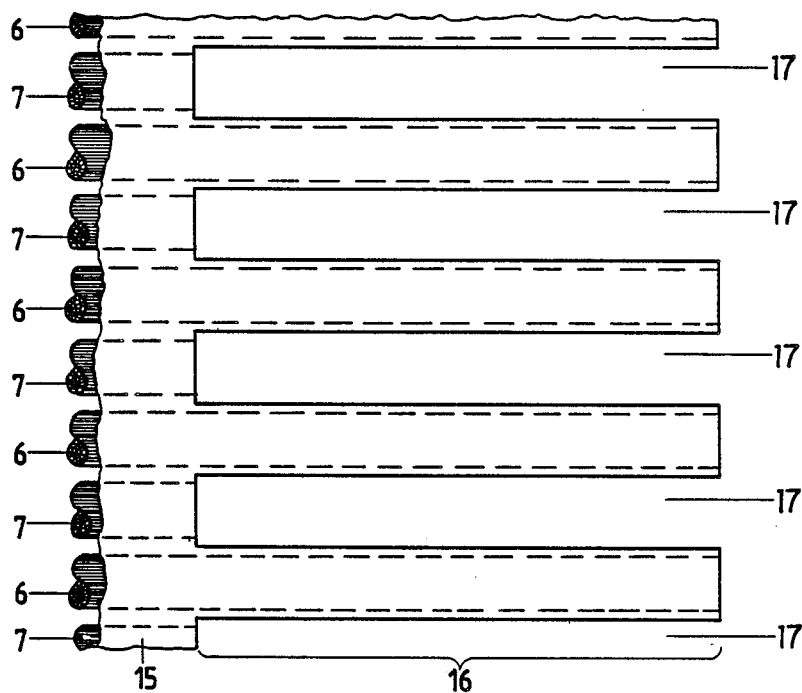
FIG. 4 shows a conveyor belt end with the cotton cables being cut away.
Figure 5:
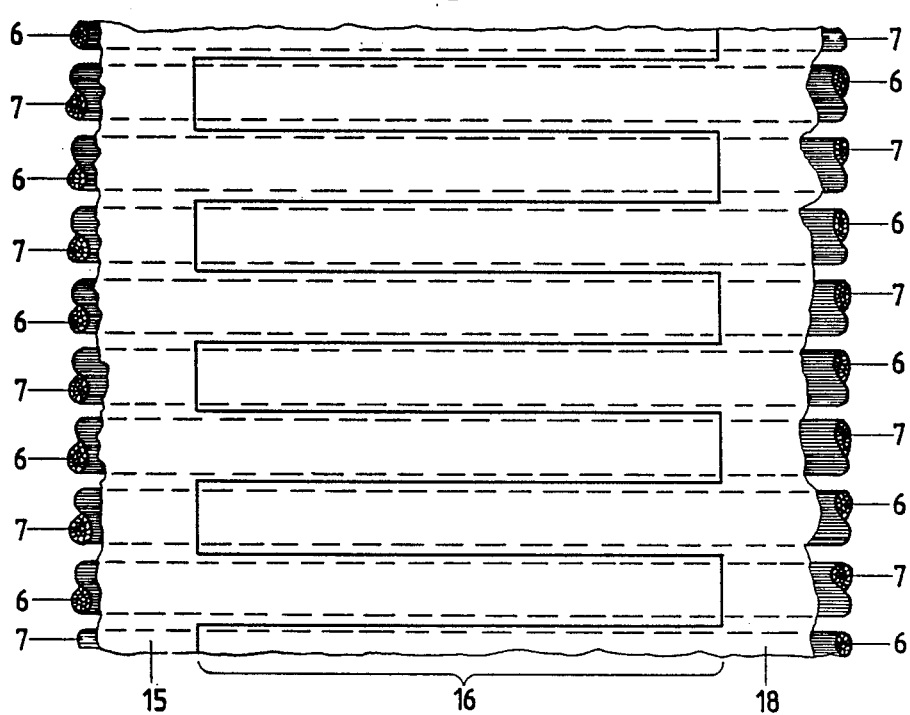
FIG. 5 shows the joint of the conveyor belt.

An important advantage of the conveyor belt according to the invention is that the two ends thereof can be joined in a particularly effective manner. In FIG. 4 the one end 15 of a conveyor belt 1 according to the invention is shown in plan view in the situation in which over the length 16 of the connection to be made all cotton cable or cords 7 are cut away, so that over the connecting distance 16 some kind of fork of PPDT cables or cords 6 with free interspaces 17 is formed. Of the other end 18 of the conveyor belt cotton cables or cords 7 are cut away in the same way as at the end 15. The PPDT cables or cords 6 left in the two belt ends 15 and 18 with the upper and the lower fabrics 13 and 14, respectively, and kept together by the PVC matrix are subsequently impregnated with PVC paste. Then the two belt ends 15 and 18 are slipped into each other and gelled together. In this way the very strong joint between the two ends of the conveyor belt is obtained which is shown in FIG. 5. According to the invention it is therefore possible to obtain a very strong joint between the ends of a fire retardant heavy conveyor belt of a matrix of PVC and a compound fabric. Up to now it had been considered that such a satisfactory joint could only be made in conveyor belts of a matrix of rubber and a reinforcement of steel cables, as described in GB No. 1 279 934. For use in underground mining, however, the latter type of belts display certain disadvantages, such as a lower resistance to corrosion and less fire retardancy.

Figure 6:
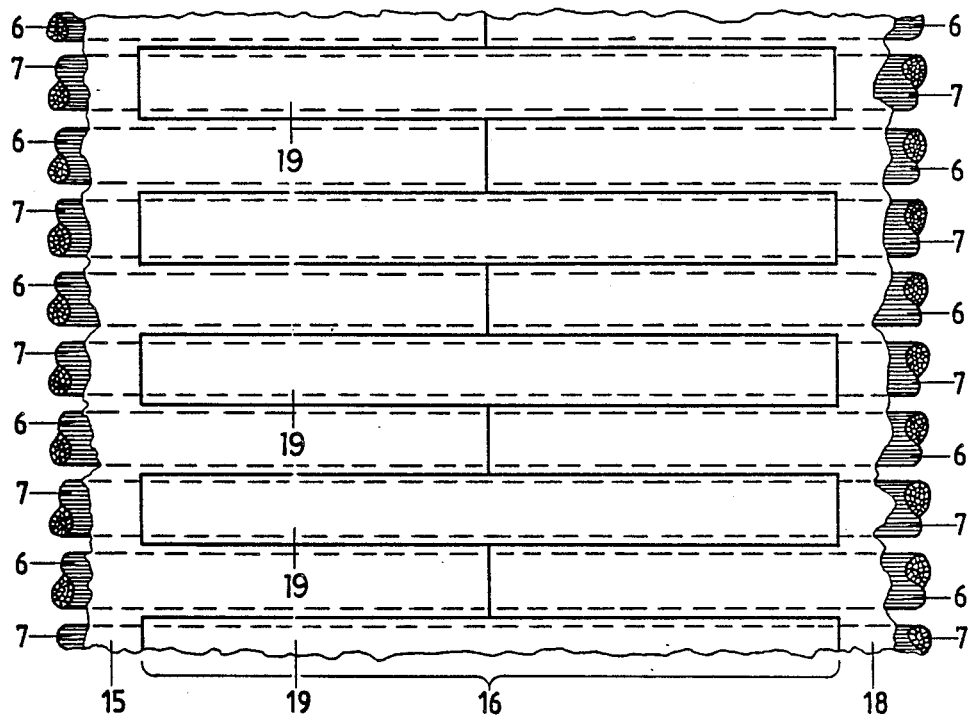
FIG. 6 shows a somewhat varied joint of the conveyor belt.

FIG. 6 shows another particularly favourable construction for joining the two ends of a conveyor belt. Also in that construction the cotton cables or cords 7 are cut away over the connecting distance in the two ends of the conveyor belt 16. Then the two ends with the ends of the PPDT cables or cords 6 which are not cut away are placed against each other and the open spaces are filled with separate portions of stress members 19, such as cables or cords that are also composed of PPDT filaments, said portions having a length which is practically equal to that of the connecting distance 16. After impregnation with PVC paste the two belts are gelled together.

Figure 7:
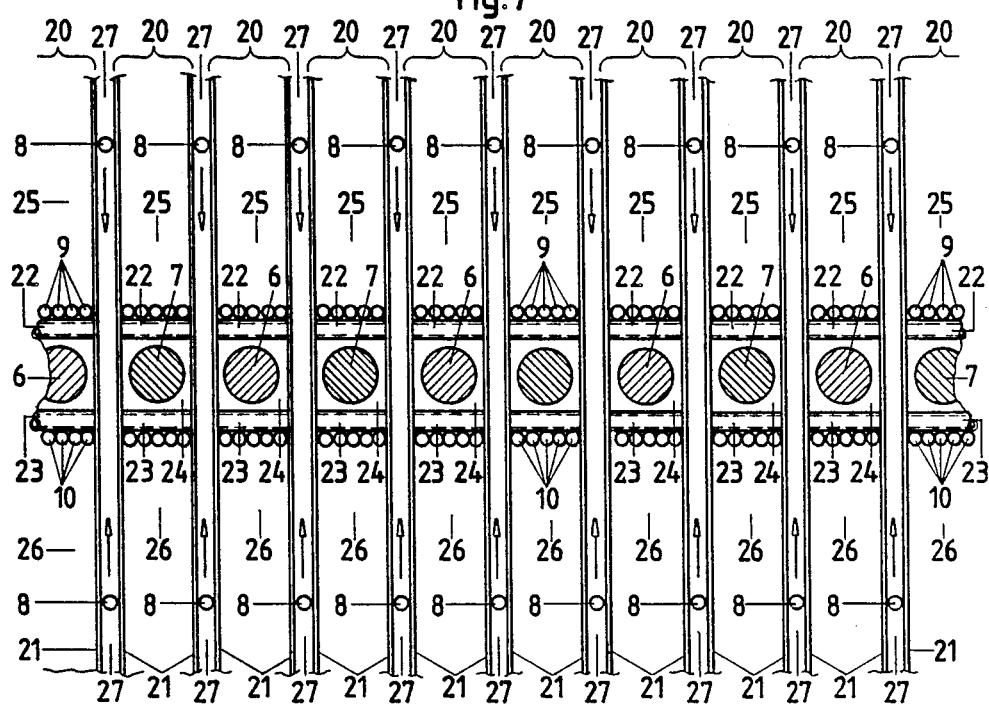
FIG. 7 shows the special compound heddles used for manufacturing the compound fabric according to the invention.

The invention also comprises a special process for manufacturing said compound fabric 5, which will be illustrated with reference to FIG. 7. In order to be able to weave the approximately 9 mm thick cables or cords 6 and 7 of PPDT and cotton special compound heddles 20 have been developed which are reciprocated by sheds in the loom(not shown). A number of these heddles are schematically illustrated in FIG. 7. Each of the compound heddles 20 consists of two steel strips 21 having a width in warp direction of 13 mm and a thickness of about 0.5 mm. Between every pair of strips 21 are two steel tubes 22 and 23 having a length of 12 mm. In vertical direction the tubes 22 and 23 are placed at a distance from each other of 12 mm. In this way between the tubes 22, 23 and the strips 21 in each heddle 20 a central locating nest 24 of 12×12 mm is formed for said PPDT cables or cords 6 and cotton cables or cords 7 each having a diameter D of about 9 mm. Further, in each of the heddles 20 there are upper and lower secondary locating nests 25 and 26, respectively, which are separated from the central locating nest 24 and serve to receive a number of the considerably thinner upper and lower warp threads 9 and 10, respectively. For each of the cables or cords 6,7 a compound heddle 20 is needed and the compound heddles are placed on sheds(not shown). The upper and the lower warp threads 9,10 are each positioned in the usual way in respective reciprocating heddles(not shown). In the spaces 27 between the successive compound heddles 20 are provided separately reciprocating heddles in which the binder warp threads 8 are placed.

In the case of the conventional weaving method for all conceivable fabrics the warps threads are separately threaded through a normal heddle, as a result of which all the warp threads, also of multi-layer fabrics, can be so positioned that they form a single layer of adjacent threads at one and the same level. When a multi-layer fabric containing thick cables or cords is to be woven, the known method leads to great problems during the passage through such a layer of reciprocating threads.

The weaving method according to the invention obviates the problems encountered in the case of the known weaving method owing to the use of said compound heddles in combination with the separate binder warp yarn heddles moving between them.

Within the scope of the invention various modifications may be made. Although the invention is first of all directed to a conveyor belt with a matrix of PVC, it may for certain uses be desirable that the PVC matrix be entirely or partially be covered with a thin layer of rubber, for instance with a view to improving the friction properties. Further, the PVC matrix may contain usual additives, such as platicizers. The term aramid as used here refers to a synthetic polyamide in which at least 85% of the amide bonds are directly linked to two aromatic rings. As examples of such aramids may be mentioned poly(p-phenylene terephthalamide) and copolyamide built up from p-phenylene diamine, 3,4'-diaminodiphenyl ether and terephthalic acid radicals.

Instead of filling elements of cotton there may be used filling elements consisting of synthetic yarns in the form of spun yarns or textured filaments yarns. Texturing may be done by crimping, blowing or the like.

We claim:

1. A conveyor belt comprising:
    a matrix based on polyvinyl chloride; and
    a reinforcing construction embedded in said matrix, said reinforcing construction comprising a compound woven fabric including:
    (a) a first layer including (i) a plurality of primary load-bearing warp members each formed by a plurality of substantially parallel cables or cords of continuous filaments of aramid and extending rectilinearly in a longitudinal direction of the belt, each of said primary load-bearing members having an outer diameter D, adjacent ones of said primary load-bearing members being spaced apart from one another to form spaces therebetween having a width which is 0.5–2.0 times said outer diameter D of said primary load-bearing members and (ii) a plurality of second nonaramid cotton comprising filling warp members respectively disposed rectilinearly in said spaces between said primary load-bearing members;
    (b) a second layer provided on an upper side of said first layer and a third layer provided on a lower side of said first layer, said second and third layers each comprising cotton yarns adhered to said polyvinyl chloride matrix; and
    (c) a plurality of binder warp yarns or filaments which interconnect said first layer, said second layer and said third layer.

2. The belt as in claim 1, wherein said aramid is poly(p-phenylene terephthalamide).

3. The belt as in claim 1, wherein each of secondary warp members is a cotton cable or cord.

4. The belt as in claim 1, wherein said outer diameter D of said primary stress members is in the range of 4 to 15 mm.

* * * * *